(12) United States Patent
Miyano

(10) Patent No.: US 8,487,671 B2
(45) Date of Patent: Jul. 16, 2013

(54) INTERNAL-CLOCK ADJUSTING CIRCUIT

(75) Inventor: Kazutaka Miyano, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 194 days.

(21) Appl. No.: 13/040,846

(22) Filed: Mar. 4, 2011

(65) Prior Publication Data

US 2011/0227618 A1  Sep. 22, 2011

(30) Foreign Application Priority Data

Mar. 16, 2010  (JP) .................................. 2010-059090

(51) Int. Cl.
*H03L 7/00* (2006.01)
(52) U.S. Cl.
USPC ............ 327/141; 327/175; 327/156; 375/373
(58) Field of Classification Search
USPC .................... 327/156, 141; 375/373
See application file for complete search history.

(56) References Cited

U.S. PATENT DOCUMENTS

| 6,911,853 | B2 * | 6/2005 | Kizer et al. | 327/158 |
| 7,705,642 | B2 * | 4/2010 | Mai | 327/158 |
| 2005/0206419 | A1 * | 9/2005 | Kizer et al. | 327/158 |
| 2008/0157836 | A1 * | 7/2008 | Cho | 327/158 |
| 2008/0191782 | A1 * | 8/2008 | Mai | 327/530 |

FOREIGN PATENT DOCUMENTS

| JP | 2003-110411 | 4/2003 |
| JP | 2006-60842 | 3/2006 |

* cited by examiner

*Primary Examiner* — Ryan Jager
(74) *Attorney, Agent, or Firm* — Morrison & Foerster LLP

(57) ABSTRACT

A delay circuit generates an internal clock signal or a second clock signal by delaying an external clock signal. A detection-potential generation circuit included in a phase-difference determination circuit generates a detection potential corresponding to a difference between a timing of an active edge of an internal clock signal or a third clock signal and a timing of the target external clock signal in a first node. A reference-potential generation circuit included in the phase-difference determination circuit generates a reference potential in a second node. A phase control circuit delays the second clock signal according to the detection potential. At this time, when the detection potential is higher than the reference potential, an adjustment amount of the second clock signal per adjustment changes.

19 Claims, 9 Drawing Sheets

INTERNAL-CLOCK ADJUSTING CIRCUIT

BACKGROUND OF THE INVENTION

1. Field of the Invention

The present invention relates to an internal-clock adjusting circuit to adjust a timing of an internal clock signal.

2. Description of Related Art

Data is input to or output from a semiconductor device such as an SDRAM (Synchronous Dynamic Random Access Memory) synchronously with a clock signal supplied from outside (hereinafter, "external clock signal"). However, when the semiconductor device outputs data while using the external clock signal as a timing signal, a phase of the output data slightly lags behind that of the external clock signal because of an operating delay in an output buffer circuit. To avoid this delay, the semiconductor device often generates an internal clock signal having a phase advanced by an internal-clock adjusting circuit such as a DLL (Delay Locked Loop) circuit by as much as the operating delay, and outputs data while using the internal clock signal as a timing signal.

The internal-clock adjusting circuit adjusts a phase of the internal clock signal in a direction of decreasing a phase difference between the external clock signal and the internal clock signal at regular intervals, for example, at intervals of 16 clocks after power-on. Specifically, the internal-clock adjusting circuit decreases the phase difference by adjusting a timing of a rising edge of the internal clock signal. When the phase difference is within a minimum resolving power of the internal-clock adjusting circuit, then the DLL circuit turns into a DLL locked state and the internal clock signal follows the external clock signal. Thereafter, the internal-clock adjusting circuit readjusts the phase of the internal clock signal when another phase difference occurs.

Furthermore, a duty cycle of the internal clock signal is desirably about 50%. Therefore, the internal-clock adjusting circuit adjusts the duty cycle of the internal clock signal to be closer to 50% at intervals of, for example, 32 clocks. Specifically, the internal-clock adjusting circuit makes the duty cycle of the internal clock signal closer to the ideal value of 50% by adjusting a timing of a falling edge of the internal clock signal. When a deviation of the duty cycle is eliminated, the DLL circuit turns into a DLL locked state. Thereafter, the internal-clock adjusting circuit readjusts the duty cycle of the internal clock signal when another duty cycle deviation occurs. A conventional DLL circuit is disclosed in Japanese Patent Application Laid-Open Nos. 2003-110411 and 2008-060842.

When an adjustment amount per adjustment is set small, the internal-clock adjusting circuit can make a fine adjustment. However, when a timing of an edge largely deviates from a target timing in an unlocked state, it takes long time to reach the locked state. At the time of power-on, in particular, the deviation tends to be large. When the adjustment amount per adjustment is set large, time reduction can be achieved. However, because of coarse adjustment, the timing of the edge tends to deviate from the target timing in the locked state.

SUMMARY

In one embodiment, there is provided an internal-clock adjusting circuit that includes: a delay circuit that outputs a second clock signal by delaying a first clock signal; a detection-potential generation circuit that generates a detection potential in a first node, the detection potential corresponding to a difference between a timing of an active edge of the second clock signal and a target timing; reference-potential generation circuit that generates a reference potential in a second node, the reference potential corresponding to a difference as a predetermined boundary value; and an active-edge adjusting circuit that delays the second clock signal according to the detection potential. The active-edge adjusting circuit changes a delay amount of the second internal clock signal according to a difference between the detection potential in the first node and the reference potential in the second node.

According to the present invention, it makes easier to ensure both precision and high-speed performance in the timing adjustment of the internal clock signal.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

An internal-clock adjusting circuit generates an internal clock signal so that a phase of an output data matches to that of an external clock signal. The internal-clock adjusting circuit sets an adjustment pitch of a phase adjustment of the internal clock signal to be relatively high when a phase difference between the both clock signals is large, and low when the phase difference is small. Strictly speaking, the external clock signal is a kind of an internal clock signal since the external clock signal is supplied to the internal-clock adjusting circuit via an input receiver within a semiconductor device.

The internal-clock adjusting circuit controls a duty cycle of the internal clock signal to be closer to 50%. The internal-clock adjusting circuit sets a duty cycle pitch of the internal clock signal to be relatively high when the duty cycle of the internal clock signal largely deviates from 50%, and relatively low when the duty cycle is close to 50%.

Preferred embodiments of the present invention will be explained below in detail with reference to the accompanying drawings.

Figure 1:
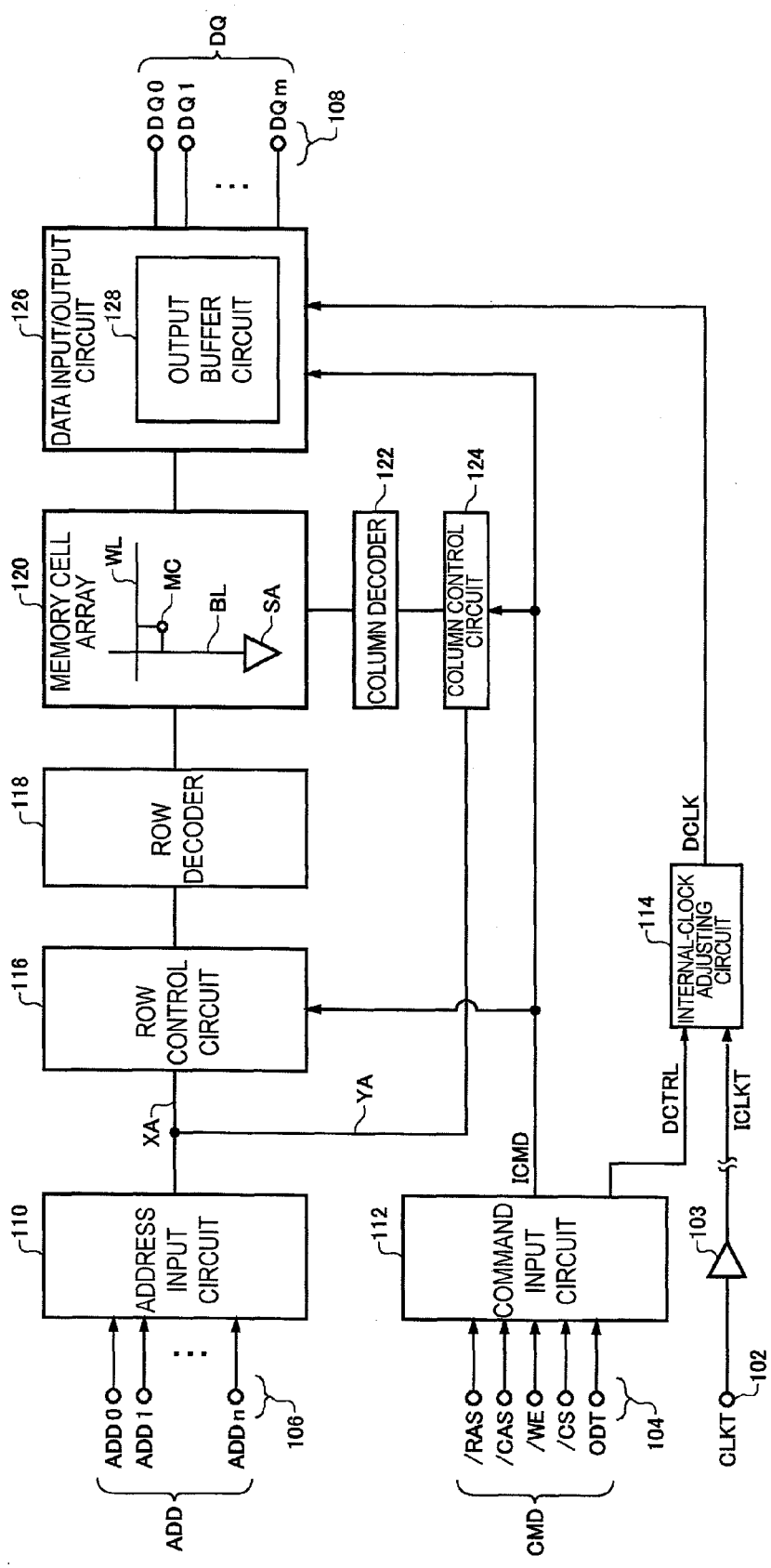
FIG. 1 is a functional block diagram of a semiconductor memory device.

FIG. 1 is a functional block diagram of a semiconductor memory device 100. The semiconductor memory device 100 according to an embodiment of the present invention is a DDR (Double-Data-Rate) SDRAM (Synchronous Dynamic Random Access Memory). The semiconductor memory device 100 includes, as external terminals, a clock terminal 102, command terminals 104, address terminals 106, and data input/output terminals 108. Although the semiconductor memory device 100 includes other terminals such as a power supply terminal, a data strobe terminal, a reset terminal, and a calibration terminal, these terminals are not shown in FIG. 1.

An external clock signal CLKT is supplied to the clock terminal 102. The external clock signal CLKT is supplied to an input receiver 103, and an internal clock signal ICLKT output from the input receiver 103 is supplied to an internal-clock adjusting circuit 114 as "first clock signal". The internal-clock adjusting circuit 114 generates an internal clock signal DCLK serving as "second clock signal" based on the internal clock signal ICLKT and supplies the internal clock signal DCLK to a data input/output circuit 126.

A row address strobe signal /RAS, a column address strobe signal /CAS, a write enable signal /WE, a chip select signal /CS, and an on-die termination signal ODT (hereinafter, "command signals CMD" collectively) are supplied to the command terminals 104, respectively. The command signals CMD are supplied to a command input circuit 112. The command input circuit 112 decodes the command signals CMD, thereby generating various internal command signals ICMD. The internal command signals ICMD are supplied to a row control circuit 116, a column control circuit 124, a data input/output circuit 126 and the like.

Address signals ADD are supplied to the address terminals 106, respectively. The address signals ADD are supplied to an address input circuit 110. Among the address signals ADD, a row address XA is supplied to the row control circuit 116 and a row decoder 118 and a column address YA is supplied to the column control circuit 124 and a column decoder 122.

The row decoder 118, which is controlled by the row control circuit 116, selects one of word lines WL included in a memory cell array 120 according to the row address XA. In the memory cell array 120, a plurality of word lines WL intersect a plurality of bit lines BL and memory cells MC are arranged at points of intersections, respectively.

The column decoder 122, which is controlled by the column control circuit 124, selects one of bit lines BL included in the memory cell array 120 according to the column address YA. The selected bit line BL is connected to the data input/output circuit 126 via a sense amplifier SA. Access-target memory cells MC are thereby connected to the data input/output terminals 108 via the data input/output circuit 126.

The data input/output circuit 126 performs data input/output operation synchronously with the internal clock signal DCLK. The data input/output terminal 126 includes an output buffer circuit 128. The data input/output circuit 126, which is controlled by the internal clock signal DCLK, outputs data to the data input/output terminals 108 via the output buffer circuit 128.

An adjustment activation signal DCTRL is input to the internal-clock adjusting circuit 114. The adjustment activation signal DCTRL is an active-high signal supplied from the command input circuit 112 to the internal-clock adjustment circuit 114. The adjustment activation signal DCTRL is made active at the time, for example, of turning on power of the semiconductor device 100 or of recovery from a self refresh mode.

It is necessary to synchronize both input data and output data to or from the semiconductor device 100 with the external clock signal CLKT. However, it is difficult to synchronize an output timing of each data signal DQ with the original external clock signal CLKT because of occurrence of a propagation delay in the output buffer circuit 128 or the like even when the external clock signal CLKT is supplied to the data input/output circuit 126 as it is. Further, a duty cycle of the external clock signal CLKT deviates from an ideal value (50%) when a waveform distortion occurs to the external clock signal CLKT.

Therefore, to solve these problems, the internal-clock adjusting circuit 114 according to the present embodiment controls a timing of the internal clock signal DCLK so that data can be input or output in phase with the original external clock signal CLKT with the duty cycle of 50%.

Figure 2:
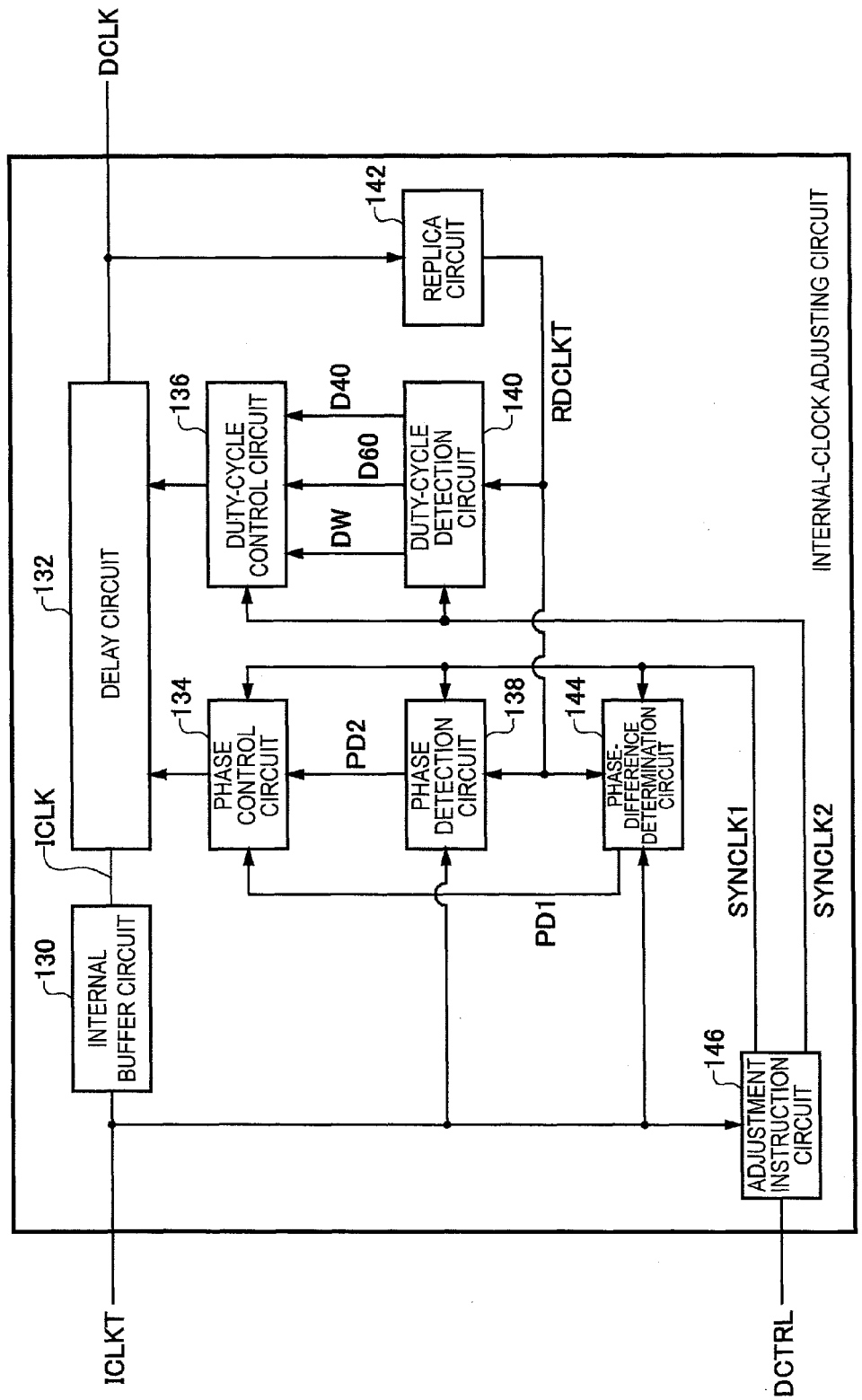
FIG. 2 is a functional block diagram of an internal-clock adjusting circuit.

FIG. 2 is a functional block diagram of the internal-clock adjusting circuit 114. The internal-clock adjusting circuit 114 includes an internal buffer circuit 130, a delay circuit 132, a phase control circuit 134, a duty-cycle control circuit 136, a phase detection circuit 138, a duty-cycle detection circuit 140, a replica circuit 142, an adjustment instruction circuit 146, and a phase-difference determination circuit 144. When the adjustment activation signal DCTRL is made active, the adjustment instruction circuit 146 sets a first adjustment signal SYNCLK1 to be active-high at intervals of 16 clocks and a second adjustment signal SYNCLK2 to be active-high at intervals of 32 clocks. The first adjustment signal SYNCLK1 controls the phase control circuit 134, the phase detection circuit 138, and the phase-difference determination circuit 144. The second adjustment signal SYNCLK2 controls the duty-cycle control circuit 136 and the duty-cycle detection circuit 140.

The external clock signal CLKT is received by the input receiver 103 and output from the input receiver 103 as the internal clock signal ICLKT. The internal clock signal ICLKT is received by the internal buffer circuit 130 and output from the internal buffer circuit 130 as an internal clock signal ICLK. Further, the internal clock signal ICLK is received by the delay circuit 132 and output from the delay circuit 132 as the internal clock signal DCLK. The delay circuit 132 delays a rising edge and a falling edge of the external clock signal CLKT. The phase control circuit 134 controls a delay amount of the rising edge and the duty-cycle control circuit 136 controls a delay amount of the falling edge. The phase control circuit 134 and the duty-cycle control circuit 136 function as "active-edge adjusting circuits" for controlling a phase and a duty cycle of the internal clock signal DCLK, respectively.

The internal clock signal DCLK is input to the phase detection circuit 138, the duty-cycle detection circuit 140, and the phase-difference determination circuit 144 via the replica circuit 142. Note that the replica circuit 142 is substantially identical in configuration to the output buffer circuit 128 included in the data input/output circuit 126. Accordingly, an internal clock signal RDCLKT (a third clock signal) output from the replica circuit 142 is almost equal to the data input/output terminals 108 in data input/output timing.

The internal clock signals ICLKT and RDCLKT are input to the phase-difference determination circuit 144. The phase-difference determination circuit 144 compares timings of rising edges of the both clock signals ICLKT and RDCLKT with each other. When a phase difference is equal to or greater than a predetermined boundary value (a quarter cycle in this embodiment), the phase-difference determination circuit 144 sets a first delay detection signal PD1 to be high (H) and outputs the first delay detection signal PD1. The first delay detection signal PD1 is input to the phase control circuit 134. A circuit configuration of the phase-difference determination circuit 144 is described later in detail with reference to FIG. 3 and contents of control performed by the phase-difference determination circuit 144 are described later in detail with reference to FIGS. 4 and 5.

The internal clock signals ICLKT and RDCLKT are also input to the phase detection circuit 138. The phase detection circuit 138 compares the timings of the rising edges of the both clock signals ICLKT and RDCLKT with each other. When a phase of the internal clock signal RDCLKT lags behind that of the internal clock signal ICLKT, the phase detection circuit 138 sets a second delay detection signal PD2 to be high (H) and outputs the second delay detection signal PD2. The second delay detection signal PD2 is input to the phase control circuit 134 as well as the first delay detection signal PD1. The phase detection circuit 138 is a well-known circuit.

The phase control circuit 134 controls the delay circuit 132 to reduce a delay amount of the internal clock signal ICLKT when the second delay detection signal PD2 is high (H), that is, a phase delay occurs. The phase control circuit 134 controls the delay circuit 132 to increases an adjustment amount of the internal clock signal ICLKT particularly when the first delay detection signal PD1 is high (H), that is, the phase delay is equal to or greater than the quarter cycle. Contents of control performed by the phase control circuit 134 are described later with reference to FIG. 6.

The internal clock signal RDCLKT is input to the duty-cycle detection circuit 140. The duty-cycle detection circuit 140 measures a duty cycle of the internal clock signal RDCLKT. When the duty cycle is equal to or higher than 50%, the duty-cycle detection circuit 140 sets a duty-cycle detection signal DW to be low (L) and outputs the duty-cycle detection signal DW. When the duty cycle is lower than 50%, the duty-cycle detection circuit 140 sets the duty-cycle detection signal DW to be high (H) and outputs the duty-cycle detection signal DW. When the duty cycle is equal to or higher than 60% (a first boundary value), the duty-cycle detection circuit 140 sets a first-boundary detection signal D60 to be high (H). When the duty cycle is lower than 40% (a second boundary value), the duty-cycle detection circuit 140 sets a second-boundary detection signal D40 to be high (H). The duty-cycle detection signal DW, the first-boundary detection signal D60, and the second-boundary detection signal D40 are input to the duty-cycle control circuit 136. Namely, when a logical disjunction, that is, an OR between the first-boundary detection signal D60 and the second-boundary detection signal D40 is high (H), this means that the duty cycle of the internal clock signal RDCLKT largely deviates from the ideal value of 50%.

The duty-cycle control circuit 136 determines whether the duty cycle of the internal clock signal RDCLKT is high or low based on the duty-cycle detection signal DW, and controls the delay circuit 132 according to a determination result, thereby delaying a timing of a falling edge of the internal clock signal ICLKT. The duty cycle of the internal clock signal DCLK thereby changes. When either the first-boundary detection signal D60 or the second-boundary detection signal D40 is active-high, the duty-cycle control circuit 136 sets the adjustment amount particularly large.

Figure 3:
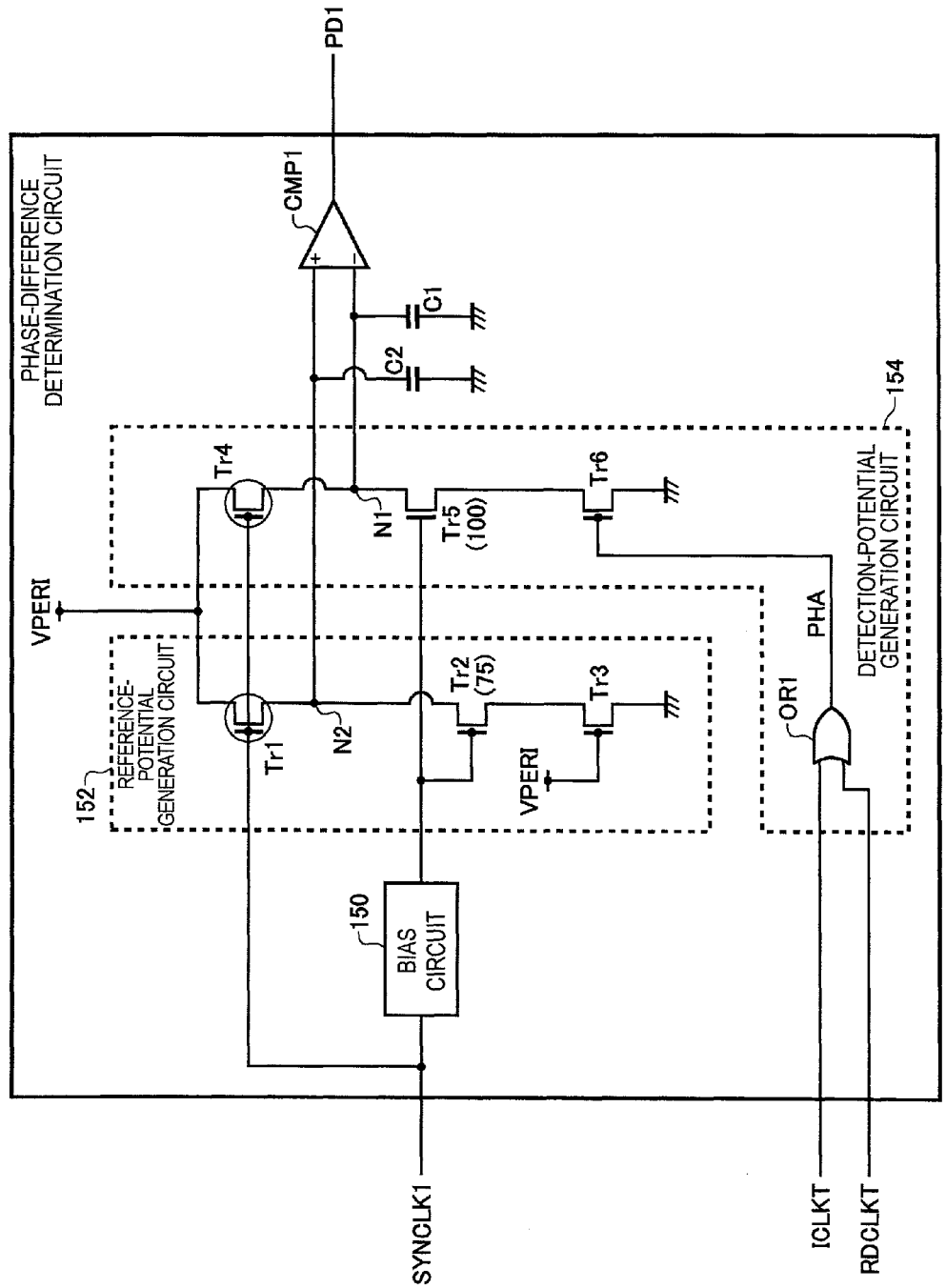
FIG. 3 is a circuit diagram of a phase-difference determination circuit.

FIG. 3 is a circuit diagram of the phase-difference determination circuit 144. The phase-difference determination circuit 144 includes a reference-potential generation circuit 152, a detection-potential generation circuit 154, a bias circuit 150, and a comparator CMP1. In the reference-potential generation circuit 152, a power supply potential VPERI and a ground potential VSS are connected in series via transistors Tr1 to Tr3. The transistor Tr3 is always turned on since a gate potential of the transistor Tr3 is set equal to the power supply potential VPERI. In the detection-potential generation circuit 154, the power supply potential VPERI and the ground potential VSS are connected in series via transistors Tr4 to Tr6. The transistors Tr1 and Tr4 are P-channel MOS (Metal Oxide Semiconductor) (PMOS) transistors whereas the other transistors Tr2, Tr3, Tr5, and Tr6 are N-channel MOS (NMOS) transistors.

In the reference-potential generation circuit 152, a potential of a node N2 that is a connecting point at which the transistor Tr1 is connected to the transistor Tr2 is extracted as "reference potential". The reference potential is input to a non-inverting input of the comparator CMP1. In the detection-potential generation circuit 154, a potential of a node N1 that is a connecting point at which the transistor Tr4 is connected to the transistor Tr5 is extracted as "detection potential". The detection potential is input to an inverting input of the comparator CMP1. When the reference potential is larger than the detection potential, the first delay detection signal PD1 output from the comparator CMP1 is high (H). Note that capacitors C1 and C2 are connected to between the node N1 and the ground potential VSS and between the node N2 and the ground potential VSS, respectively.

When the first adjustment signal SYNCLK1 is low (inactive), the transistors Tr1 and Tr4 are turned on and the transistors Tr2 and Tr5 are turned off. Due to this, both of the capacitors C1 and C2 connected to the nodes N1 and N2, respectively are precharged with the power supply potential VPERI.

When the first adjustment signal SYNCLK1 is high (active), the transistors Tr1 and Tr4 are turned off and the transistors Tr2 and Tr5 are turned on instead. Note that a size ratio of the transistor Tr2 to the transistor Tr5 is 75:100. That is, an ON-current ratio of the transistor Tr2 to the transistor Tr5 is 75:100. The transistors Tr3 and Tr5 are equal in size. Accordingly, when the transistors Tr1 and Tr4 are turned off and the transistors Tr2, Tr3, Tr5, and Tr6 are turned on, a discharge rate of the capacitor C1 is higher than that of the capacitor C2. That is, the detection potential falls at a higher speed than the reference potential.

An OR circuit OR1 included in the detection-potential generation circuit 154 outputs an OR between the internal clock signals ICLKT and RDCLKT as a phase signal PHA. The transistor Tr3 is always turned on whereas the transistor Tr6 is controlled to be turned on or off according to the phase signal PHA.

Note that the ground potential VSS can be set as a precharge level of precharging the capacitors C1 and C2 in place of the power supply potential VPERI. In this case, the transistors Tr1 and Tr4 are changed from PMOS transistors to NMOS transistors and the other transistors Tr2, Tr3, Tr5, and Tr6 are changed from NMOS transistors to PMOS transistors. Furthermore, the gate potential of the transistor Tr3 is changed to be set equal to the ground potential VSS. It is also necessary to change a size ratio of the transistor Tr2 to the transistor Tr4 to 1/4:1.

Figure 4:
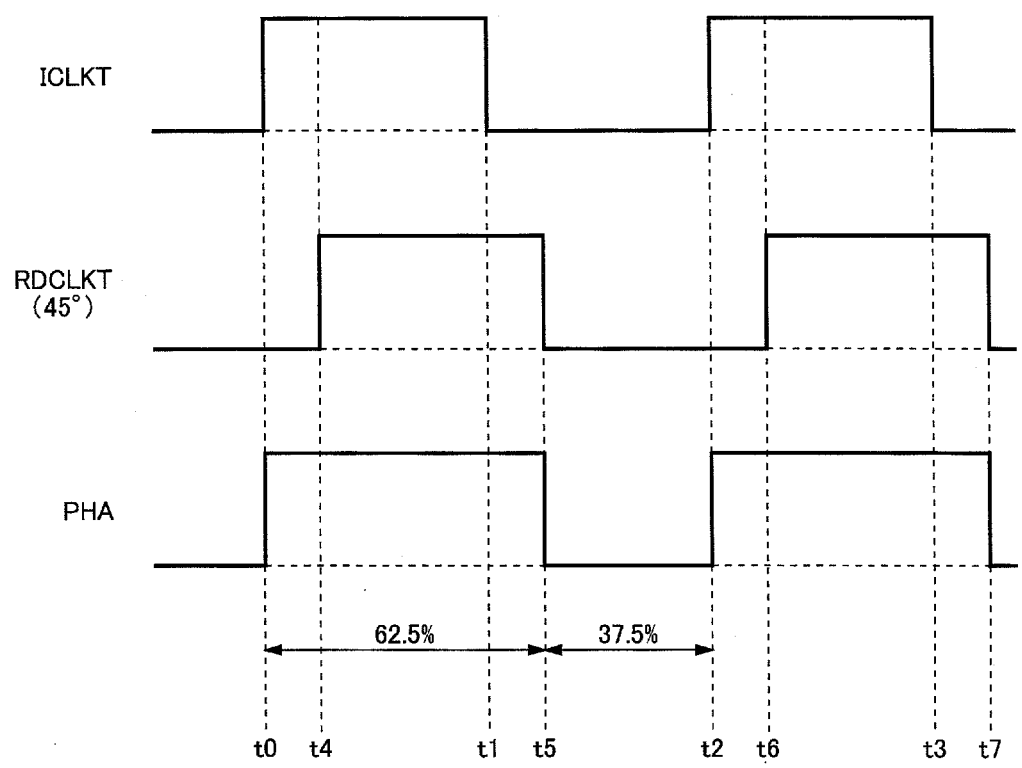
FIG. 4 is a timing chart when an external clock signal and an internal clock signal deviate in phase by a one-eighth cycle.

FIG. 4 is a timing chart when the internal clock signal ICLKT deviates in phase from the internal clock signal RDCLKT by a one-eighth cycle. It is assumed here that duty cycles of the internal clock signals ICLKT and RDCLKT are both 50%. In FIG. 4, the timing of the rising edge of the internal clock signal ICLKT is time t0, and that of the rising edge of the internal clock signal RDCLKT is time t4. A period from the time t0 to the time t4 corresponds to a one-eighth cycle of the internal clock signal ICLKT (or the internal clock signal RDCLKT).

The internal clock signal ICLKT is at high level in a period from t0 to t1 and at low level in a period from t1 to t2. On the other hand, the internal clock signal RDCLKT is at high level in a period from t4 to t5 and at low level in a period from t5 to t6. The phase signal PHA is at high level in a period from t0 to t5 and at low level in a period from t5 to t6 since the phase signal PHA is the OR between the internal clock signals ICLKT and RDCLKT. That is, a duty cycle of the phase signal PHA is higher than those of the internal clock signals ICLKT and RDCLKT by as much as a phase difference (t4 to t0) between the internal clock signals ICLKT and RDCLKT. In an example of FIG. 4, the duty cycle of the phase signal PHA is 62.5% (=50+12.5) since the phase difference is the one-eighth cycle (12.5% of one cycle).

In this case, the transistor Tr3 of the detection-potential generation circuit 154 is repeatedly turned on and off with the duty cycle of 62.5%. On the other hand, the transistor Tr3 is always turned on. As described above, the ON-current ratio of the transistor Tr2 to the transistor Tr5 is 75:100. Therefore, when the transistor Tr3 is repeatedly turned on and off with the duty cycle of 62.5%, an ON-current ratio of the transistor Tr3 to the transistor Tr5 is eventually 75:62.5. Overall, therefore, the capacitor C2 is more discharged than the capacitor C1 and the node N1 is higher in potential than the node N2. That is, the first delay detection signal PD1 is low (L) because of the detection potential is larger than the reference potential.

Figure 5:
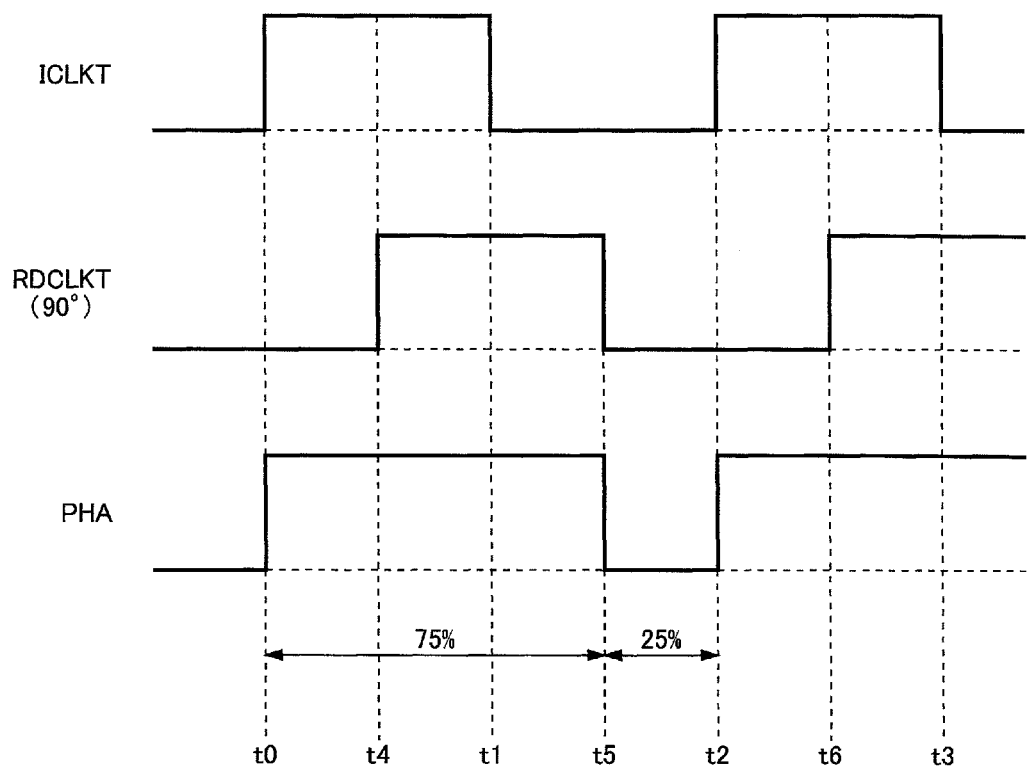
FIG. 5 is a timing chart when an external clock signal and an internal clock signal deviate in phase by a quarter cycle.

FIG. 5 is a timing chart when the internal clock signal ICLKT deviates in phase from the internal clock RDCLKT by a quarter cycle. Similarly to FIG. 4, in FIG. 5, the timing of the rising edge of the internal clock signal ICLKT is time t0 and that of the rising edge of the internal clock signal RDCLKT is t4. A period from the time t0 to the time t4 corresponds to a quarter cycle of the internal clock signal ICLKT (or the internal clock signal RDCLKT).

The duty cycle of the phase signal PHA is higher than those of the internal clock signals ICLKT and RDCLKT by as much as a phase difference (t4 to t0) between the internal clock signals ICLKT and RDCLKT since the phase signal PHA is the OR between the internal clock signals ICLKT and RDCLKT. In an example of FIG. 5, the duty cycle of the phase signal PHA is 75% (=50+25) since the phase difference is the quarter cycle (25% of one cycle).

The transistor Tr3 of the detection-potential generation circuit 154 is repeatedly turned on and off with the duty cycle of 75%. The ON-current ratio of the transistor Tr2 to the transistor Tr5 is 75:100. Therefore, when the transistor Tr3 is repeatedly turned on and off with the duty cycle of 75%, the ON-current ratio of the transistor Tr3 to the transistor Tr5 is eventually 1:1. That is, the nodes N1 and N2 are equal in potential since discharge amounts of the capacitors C1 and C2 coincide. That is, the first delay detection signal PD1 is high (H) when the phase difference between the internal clocks ICLKT and RDCLKT is equal to or greater than the quarter cycle.

Figure 6:
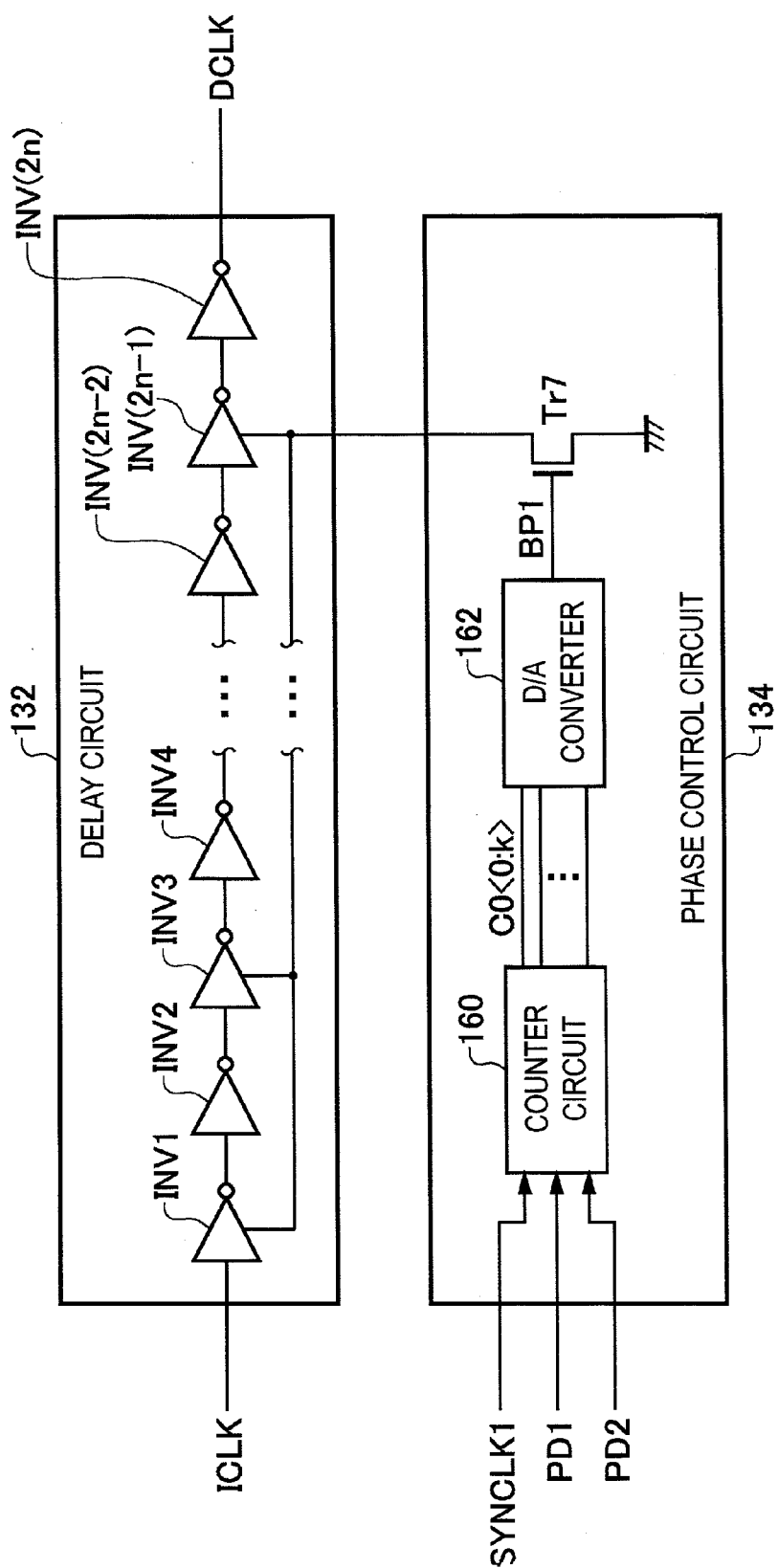
FIG. 6 is a functional block diagram showing a relation between a delay circuit and a phase control circuit.

FIG. 6 is a functional block diagram showing a relation between the delay circuit 132 and the phase control circuit 134. In the delay circuit 132, even-numbered inverters INV1 to INV($2n$) are cascaded. These inverters INV act as delay elements and the delay circuit 132 delays the input internal clock signal ICLK and outputs the internal clock signal DCLK. The internal clock signal ICLK is substantially identical to the internal clock signal ICLKT.

The phase control circuit 134 includes a counter circuit 160, a D/A converter 162, and a transistor Tr7. The counter circuit 160 has a count value updated by the first adjustment signal SYNCLK1, and the first delay detection signal PD1 and the second delay detection signal PD2 are input to the counter circuit 160. The first delay detection signal PD1 is high (H) when the phase difference between the internal clock signals ICLKT and RDCLKT is equal to or greater than the quarter cycle, and low otherwise. The second delay detection signal PD2 is high (H) when a phase delay occurs and low (L) when a phase lead occurs.

The counter circuit 160 counts up to increase a count value (C0<0:k>) of k+1 bits when the second delay detection signal PD2 is high and counts it down to decrease the count value when the second delay detection signal PD2 is low. The counter circuit 160 counts up or down by one bit each when the first delay detection signal PD1 is low, and counts up or down by two bits each when the first delay detection signal PD1 is high. The count value is input to the D/A converter 162. The D/A converter 162 generates a bias voltage BP1 proportional to the count value.

The bias voltage BP1 serves as a gate voltage of the transistor Tr7. The transistor Tr7 has a source grounded and a drain connected to power supply terminals of a plurality of inverters INV included in the delay circuit 132. Specifically, the drain of the transistor Tr7 is connected to odd-numbered inverters INV1, INV3, . . . and INV($2n-1$) out of the inverters INV1 to INV($2n$) included in the delay circuit 132. When the count value is higher, then the bias voltage BP1 becomes higher, and the delay made by the odd-numbered inverters INV1, INV3, and INV($2n-1$) is, therefore, smaller. In other words, delay in the rising edge of the internal clock ICLK is smaller.

When the phase difference is greater than the quarter cycle, then the first delay detection signal PD1 is high and the count value is adjusted by two bits each. When the phase difference is smaller than the quarter cycle, then the first delay detection signal PD1 is low and the count value is adjusted by one bit each. That is, while the phase difference is promptly reduced because of a large adjustment amount of the bias voltage BP1 per adjustment when the phase difference is large, the phase difference can be finely controlled because of a small adjustment amount when the phase difference is small. By using such a control method, it is possible to realize high-speed performance and precision in timing adjustment.

In the present embodiment, it is described that the count value is adjusted by one bit each or two bits each. However, an update amount of the count value per adjustment can be arbitrarily decided according to design conditions or the like. Likewise, the boundary value of the phase difference is not necessarily set to the quarter cycle can be arbitrarily set. Furthermore, a plurality of boundary value can be set. For example, the count value can be updated by two bits each when the phase difference is equal to or greater than the one-eighth cycle and smaller than the quarter cycle, and updated by three bits each when the phase difference is equal to or greater than the quarter cycle.

Figure 7:
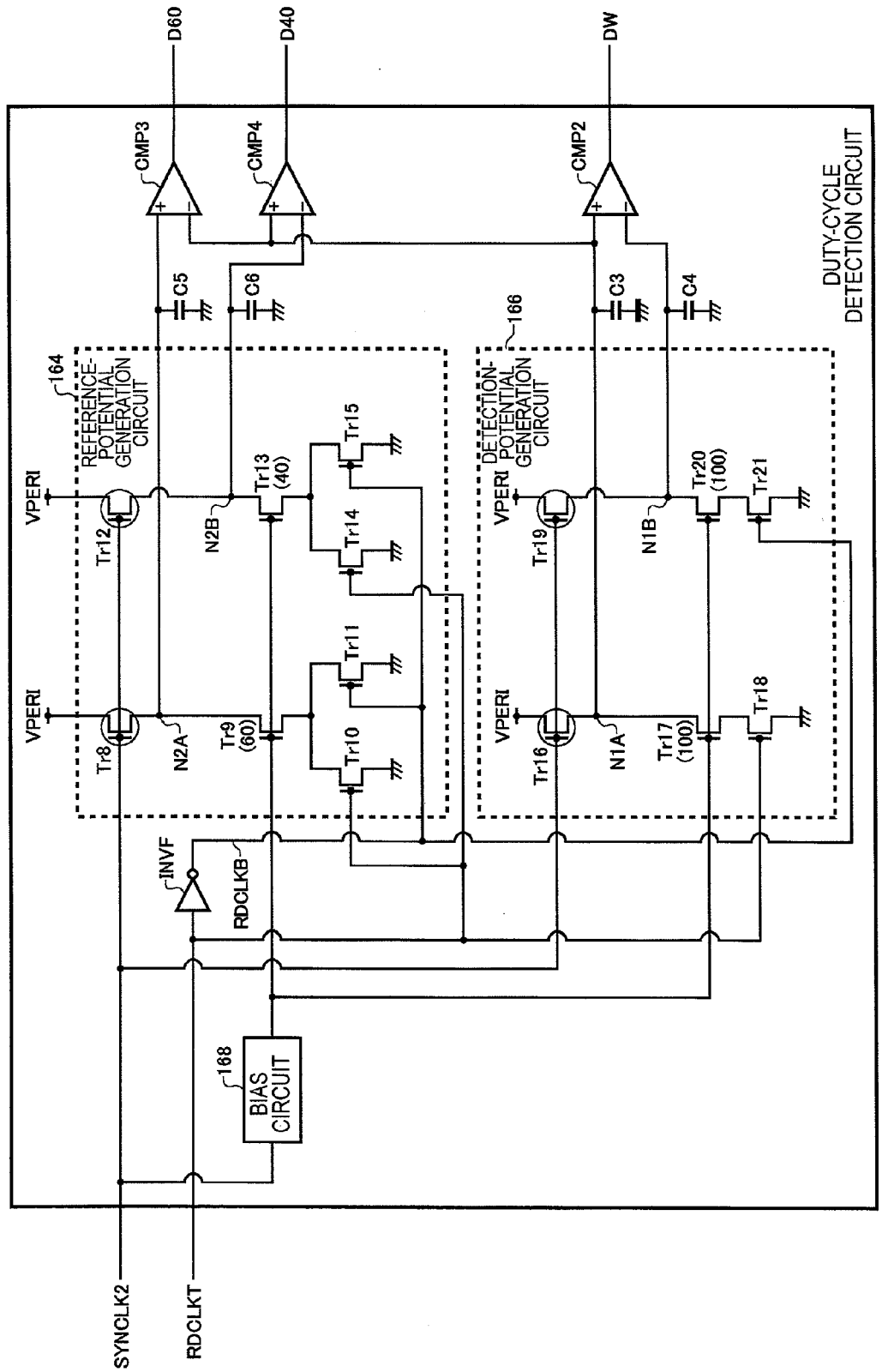
FIG. 7 is a circuit diagram of a duty-cycle detection circuit.

FIG. 7 is a circuit diagram of the duty-cycle detection circuit 140. The duty-cycle detection circuit 140 includes a reference-potential generation circuit 164, a detection-potential generation circuit 166, a bias circuit 168, and comparators CMP3, CMP4, and CMP5. The reference-potential generation circuit 164 and the detection-potential generation circuit 166 included in the duty-cycle detection circuit 144 are almost similar in configuration to the reference-potential generation circuit 152 and the detection-potential generation circuit 154 included in the phase-difference determination circuit 144 despite difference.

In the reference-potential generation circuit 164, transistors Tr8, Tr9, Tr10, and Tr11 are connected between the power supply potential VPERI and the ground potential VSS. The transistors Tr10 and Tr11 are connected in parallel. The internal clock signal RDCLKT is supplied to a gate of the transistor Tr10 and an inverted signal inverted from the internal clock signal RDCLKT by an inverter INVF is supplied to a gate of the transistor Tr11. Accordingly, a source of the transistor Tr9 is always grounded via either the transistor Tr10 or Tr11.

Furthermore, transistors Tr12, Tr13, Tr14, and Tr15 are connected between the power supply potential VPERI and the ground potential VSS. The transistors Tr14 and Tr15 are connected in parallel. The internal clock signal RDCLKT is supplied to a gate of the transistor Tr14 and the inverted signal inverted from the internal clock signal RDCLKT is supplied to a gate of the transistor Tr15. Due to this, a source of the transistor Tr13 is always grounded via either the transistor Tr14 or Tr15. The transistors Tr10, Tr11, Tr14, and Tr15 are equal in size. A size ratio of the transistor Tr9 to the transistor Tr13 is set to 60:40. The transistors Tr8 and Tr12 are PMOS transistors and the other transistors Tr9 to Tr11 and Tr13 to Tr15 are NMOS transistors.

In the reference-potential generation circuit 164, a potential at a node N2A that is a connecting point at which the transistor Tr8 is connected to the transistor Tr9 is extracted as "reference potential A" and input to a non-inverting input of the comparator CMP3. A potential at a node N2B that is a connecting point at which the transistor Tr12 is connected to the transistor Tr13 is extracted as "reference potential B" and input to an inverting input of the comparator CMP4. The nodes N2A and N2B are grounded via capacitors C5 and C6, respectively.

The second adjustment signal SYNCLK2 is input to gates of the transistors Tr8 and Tr12. The second adjustment signal SYNCLK2 is input to gates of the transistors Tr9 and Tr13 via the bias circuit 168.

In the detection-potential generation circuit 166, transistors Tr16, Tr17, and Tr18 are connected between the power supply potential VPERI and the ground potential VSS. Further, transistors Tr19, Tr20, and Tr21 are connected between the power supply potential VPERI and the ground potential VSS. The transistors Tr16 and Tr19 are PMOS transistors and the other transistors Tr17, Tr18, Tr20, and Tr21 are NMOS transistors. The second adjustment signal SYNCLK2 is input to gates of the transistors Tr16 and Tr19. The second adjustment signal SYNCLK2 is input to gates of the transistors Tr17 and Tr20 via the bias circuit 168. The internal clock signal RDCLKT is input to a gate of the transistor Tr18 and the inverted signal inverted from the internal clock signal RDCLKT is input to a gate of the transistor Tr21. That is, the transistors Tr18 and Tr21 are complementarily turned on or off. The transistors Tr18 and Tr21 are equal in size to the transistors Tr10 and the like. A size ratio of the transistor Tr17 to the transistor Tr20 is set to 100:100.

In the detection-potential generation circuit 166, a potential of a node N1A that is a connecting point at which the transistor Tr16 is connected to the transistor Tr17 is extracted as "detection potential A", and input to a non-inverting input of the comparator CMP2, an inverting input of the comparator CMP3, and a non-inverting input of the comparator CMP4. A potential at a node N1B that is a connecting point at which the transistor Tr19 is connected to the transistor Tr20 is extracted as "detection potential B" and input to an inverting input of the comparator CMP2. The nodes N1A and N1B are grounded via capacitors C3 and C4, respectively.

When the second adjustment signal SNCLK2 is low (inactive), the transistors Tr8, Tr12, Tr16, and Tr19 are turned on and the transistors Tr9, Tr13, Tr17, and Tr20 are turned off. Due to this, the capacitors C3 to C6 connected to the nodes N1A, N1B, N2A, and N2B, respectively are precharged with the power supply potential VPERI.

When the second adjustment signal SYNCLK2 is high (active), the transistors Tr8, Tr12, Tr16, and Tr19 are turned off and the transistors Tr9, Tr13, Tr17, and Tr20 are turned on instead.

When the internal clock signal RDCLKT is high, the transistor Tr18 is turned on and the transistor Tr21 is turned off. When the internal clock signal RDCLKT is low, the transistor Tr18 is turned off and the transistor Tr21 is turned on. When the duty cycle of the internal clock signal RDCLKT is 50%, the detection potential A coincides with the node detection potential B since the transistors Tr17 and Tr20 are equal in size. That is, when the duty cycle exceeds 50%, then the detection potential A falls and the duty-cycle detection signal DW is low (L). Conversely, when the duty cycle is lower than 50%, then the detection potential A increases and the duty-cycle signal DW is high (H).

The transistor Tr9 is lower in ON-current than the transistor Tr17 since a size ratio of the transistor Tr9 to the transistor Tr17 is 60:100. Accordingly, when the duty cycle of the internal clock signal RDCLKT is higher than 60%, then the detection potential A is lower than reference potential A and the first-boundary detection signal D60 is high (H).

The transistor Tr13 is lower in ON-current than the transistor Tr17 since a size ratio of the transistor Tr13 to the transistor Tr17 is 40:100. Accordingly, when the duty cycle of the internal clock signal RDCLKT is lower than 40%, then the detection potential A is higher than reference potential B and the second-boundary detection signal D40 is high (H).

Therefore, the duty-cycle detection signal DW detects whether the duty cycle deviates from 50%, and the first-boundary detection signal D60 and the second-boundary detection signal D40 indicates whether a large deviation equal to or greater than 60% or smaller than 40% occurs.

Figure 8:
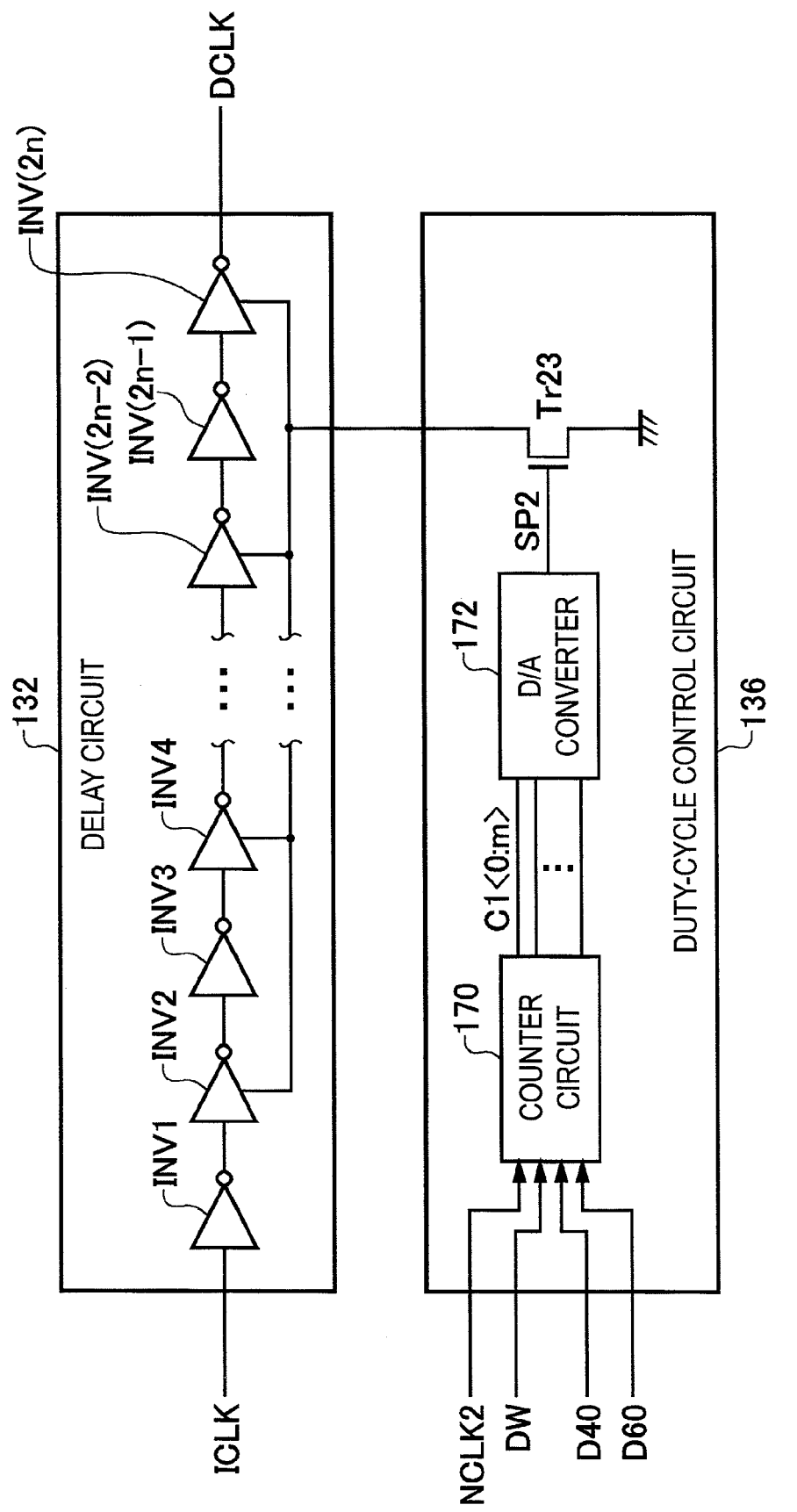
FIG. 8 is a functional block diagram showing a relation between a delay circuit and a duty-cycle control circuit.

FIG. 8 is a functional block diagram showing a relation between the delay circuit 132 and the duty-cycle control circuit 136. The duty-cycle control circuit 136 includes a counter circuit 170, a D/A converter 172, and a transistor Tr23. The counter circuit 170 has a count value updated by the second adjustment signal SYNCLK2, and the duty-cycle detection signal DW, the first-boundary detection signal D60, and the second-boundary detection signal D40 as well as the second adjustment signal SYNCLK2 are input to the counter circuit 170. The duty-cycle detection signal DW is low when the duty cycle of the internal clock signal RDCLKT is equal to or higher than 50%, and is high when the duty cycle is lower than 50%. When the duty cycle is equal to or higher than 60%, the first-boundary detection signal D60 is high. When the duty cycle is lower than 40%, the second-boundary detection signal D40 is low.

The counter circuit 170 counts down to decrease a count value (C1<0:m>) of m+1 bits when the duty-cycle detection signal DW is high. The counter circuit 170 counts it up to increase the count value when the duty-cycle detection signal DW is low. The counter circuit 170 counts by two bits each when either the first-boundary detection signal D60 or the second-boundary detection signal D40 is high. The count value is input to the D/A converter 172. The D/A converter 172 generates a bias voltage BP2 proportional to the count value.

The bias voltage BP2 serves as a gate voltage of the transistor Tr23. The transistor Tr23 has a source grounded and a drain connected to power supply terminals of a plurality of inverters INV included in the delay circuit 132. Specifically, the drain of the inverter Tr23 is connected to the even-numbered inverters INV2, INV4, ... and INV(2n) corresponding to the falling edge among the inverters INV1 to INV(2n) included in the delay circuit 132. The delay made by the even-numbered inverters INV2, INV4, . . . and INV(2n) is smaller because the bias voltage BP2 is higher as the count value is higher. In other words, the delay in the falling edge of the internal clock signal INCLK is smaller.

When the duty cycle is equal to or higher than 60% or lower than 40%, that is, the duty cycle greatly deviates from the ideal value of 50%, then either the first-boundary detection signal D60 or the second-boundary detection signal D40 is high, and the count value is adjusted by two bits each. That is, when the duty cycle largely deviates from the ideal value, the adjustment amount of the bias voltage BP2 per adjustment is large and the duty cycle, therefore, promptly improves. On the other hand, when the deviation is smaller, the adjustment amount is smaller and the duty cycle can be, therefore, finely controlled. By using such a control method, it is possible to realize both high-speed performance and precision in the adjustment of the duty cycle.

In the duty-cycle control, similarly to the timing control, an update amount of the count value per update can be arbitrarily decided according to design conditions or the like. Likewise, the boundary value is not always set to the duty cycle of 40% or 60% but can be arbitrarily set.

Figure 9:
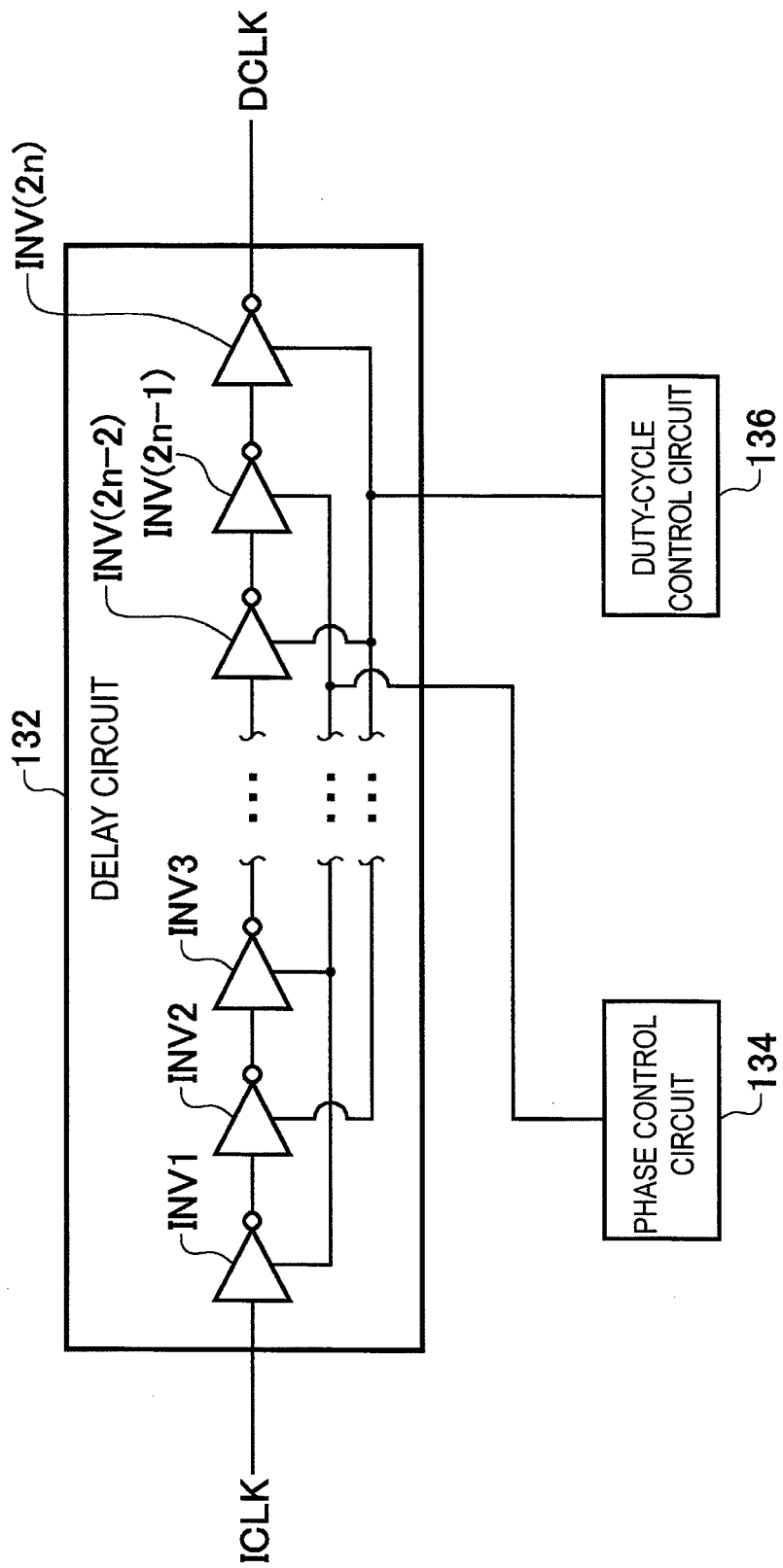
FIG. 9 is a functional block diagram collectively showing a relation among the delay circuit, the phase control circuit, and the duty-cycle control circuit.

FIG. 9 is a functional block diagram collectively showing a relation among the delay circuit 132, the phase control circuit 134, and the duty-cycle control circuit 136. The phase control circuit 134 that controls the odd-numbered inverters INV adjusts the rising edge of the internal clock signal ICLK at intervals of 16 clocks, thereby eliminating the phase difference between the external clock signal CLKT and the internal clock signal RDCLKT. Furthermore, the duty-cycle control circuit 136 that controls the even-numbered inverters INV adjusts the falling edge of the internal clock ICLK at intervals of 32 clocks, thereby making the duty cycle of the internal clock DCLKT closer to the ideal value (50%).

As described above, the semiconductor device 100 or the internal-clock adjusting circuit 114 according to the present embodiment can efficiently improve the phase delay and waveform distortion of the internal clock signal DCLKT. When the phase of the internal clock signal DCLKT largely deviates from that of the external clock signal CLKT, then the adjustment amount per adjustment is large and the phase difference can be, therefore, promptly improved. When the phase deviation is small, the adjustment amount per adjustment is small and the phase difference can be, therefore, adjusted precisely. The same holds true for the duty cycle. As a consequence, it is possible to realize both the high-speed performance and precision in the timing adjustment.

The present invention has been explained based on exemplary embodiments. However, it will be understood by persons skilled in the art that the above embodiments are only illustrative, and various changes and modifications can be made within the scope of the claims of the present invention and these changes and modifications are also included in the scope of the claims of the invention. Therefore, the descriptions and the accompanying drawings are intended only for illustrative purposes and not restrictive.

Note that the adjustment pitch is not necessarily changed for both the rising edge and the falling edge of the internal clock signal but can be changed for only one of these edges. Further, the adjustment method for the rising edge and the falling edge is not limited to the method described above. For example, the delay amount can be adjusted by changing the number of inverters to be used in the delay circuit 132.

What is claimed is:

1. A semiconductor device comprising:
a delay circuit that delays a first clock signal to generate a second clock signal; a detection-potential generation circuit that generates a detection potential corresponding to a difference between a timing of an active edge of the second clock signal and a target timing; a reference-potential generation circuit that generates a reference potential being a same potential to be obtained by the detection-potential generation circuit if a difference between a timing of an active edge of the second clock signal and the target timing is a predetermined value; and an active-edge adjusting circuit that changes an adjustment pitch of a delay amount of the delay circuit based on a relationship between the detection potential and the reference potential,
the reference-potential generation circuit generates a plurality of reference potentials corresponding to a plurality of predetermined values, respectively, and the active-edge adjusting circuit changes the adjustment pitch of the delay amount of the delay circuit based on a relationship between each of the plurality of reference potentials and the detection potential.

2. The semiconductor device as claimed in claim 1, wherein the second internal clock is supplied to a data input/output circuit of a semiconductor device as a synchronizing signal.

3. The semiconductor device as claimed in claim 2, further comprising a replica circuit that is configured to imitate an output buffer included in the data input/output circuit, and generates a third clock signal by delaying the second clock signal, wherein the detection-potential generation circuit generates the detection potential based on the third clock signal.

4. The semiconductor device as claimed in claim 3, wherein the target timing is a timing at which an active edge of the first clock signal coincides with an active edge of the third clock signal.

5. The semiconductor device as claimed in claim 4, wherein the detection-potential generation circuit generates the detection potential as a potential proportional to a phase difference between the first clock signal and the third clock signal.

6. A semiconductor device comprising: an adjustable delay circuit receiving a first clock signal, and applying a first delay amount to the first clock signal to generate a second clock signal; a replica circuit applying a second delay amount to the second clock signal to generate a replica clock signal; and a control circuit generating a detection potential corresponding to a duty rate of the replica clock signal and a reference potential corresponding to a reference duty rate, the control circuit controlling to change the first delay amount of the adjustable delay circuit at first intervals of a first period of time when the detection potential is larger than the reference potential, and controlling to change the first delay amount of the adjustable delay circuit at second intervals of a second period of time different from the first period of time when the detection potential is smaller than the reference potential.

7. The semiconductor device as claimed in claim 6, wherein the reference potential is a first reference potential and the reference duty rate is a first reference duty rate, the control circuit further generating a second reference potential corresponding to a second reference duty rate different from the first reference duty rate, the second reference potential being smaller than the first reference potential, and the control circuit controlling to change the first delay amount of the adjustable delay circuit at the first intervals when the detection potential is smaller than the second reference potential.

8. The semiconductor device as claimed in claim 7, further comprising an external data terminal and a data output buffer coupled to the external data terminal, and the data output buffer receiving the second clock signal to output data at the external data terminal in synchronism with the second clock signal.

9. The semiconductor device as claimed in claim 8, wherein the data output buffer having a third amount of delay substantially the same as the second amount of delay of the replica buffer.

10. The semiconductor device as claimed in claim 6, wherein the detection potential is corresponding to one of high and low periods of a cycle of the replica clock signal, the control circuit further generating additional detection potential that is corresponding to the other of the high and low periods of the cycle of the replica clock signal, the control circuit controlling to increase the first delay amount when the detection potential is larger than the additional detection potential, and the control circuit controlling to decrease the first delay amount when the detection potential is smaller than the additional detection potential.

11. A semiconductor device comprising:
    a delay circuit configured to receive a first clock signal to generate a second clock signal;
    a detection circuit configured to generate a reference signal and receive the second clock signal to generate a detection signal corresponding to a duty rate of the second clock signal; and
    a control circuit configured to be supplied with the reference and detection signals, to control the delay circuit to shift one of rising and falling edges of the first clock signal at first intervals when the detection signal is detected to be higher in potential than the reference signal, and to control the delay circuit to shift the one of rising and falling edges of the first clock signal at second intervals when the detection signal is detected to be lower in potential than the reference signal, the first intervals being different from the second intervals.

12. The semiconductor device as claimed in claim 11, further comprising an additional control circuit configured to receive the first and second clock signals, to compare the other of rising and falling edges of the first clock signal with the other of rising and falling edges of the second clock signal to control the delay circuit to shift the other of rising and falling edges of the first clock signal.

13. The semiconductor device as claimed in claim 12, wherein the delay circuit includes a plurality of odd-numbered inverter circuits and a plurality of even-numbered inverter circuits connected in series one after the other, each of the odd-numbered inverter circuits being controlled in delay amount by the additional control circuit, each of the even-numbered inverter circuits being controlled in delay amount by the control circuit.

14. The semiconductor device as claimed in claim 11, wherein the detection circuit is further configured to generate an additional reference signal, the control circuit being further configured to be supplied with the additional reference signal, to control the delay circuit to shift the one of rising and falling edges of the first clock signal at the second intervals when the detection signal is detected to be lower in potential than the reference signal and greater in potential than the additional reference signal, and to control the delay circuit to shift the one of rising and falling edges of the first clock signal at the first intervals when the detection signal is detected to be lower in potential than the additional reference signal.

15. The semiconductor device as claimed in claim 14, wherein the detection circuit includes:
    a voltage terminal;
    a first node at which the reference signal is generated;
    first and second transistors coupled in parallel between the first node and the voltage terminal, the first transistor taking an on-state during a high period of the second clock signal and an off-state during a low period of the second clock signal, the second transistor taking an on-state during the low period of the second clock signal and an off-state during the high period of the second clock signal;
    a third transistor coupled between the first node and the first and second transistors.

16. The semiconductor device as claimed in claim 15, wherein the detection circuit further includes:
    a second node at which the additional reference signal is generated;
    fourth and fifth transistors coupled in parallel between the second node and the voltage terminal, the fourth transistor taking an on-state during the high period of the second clock signal and an off-state during the low period of the second clock signal, the fifth transistor taking an on-state during the low period of the second clock signal and an off-state during the high period of the second clock signal; and
    a sixth transistor coupled between the second node and the fourth and fifth transistors;
    the third and sixth transistors being different in current capability from each other.

17. The semiconductor device as claimed in claim 16, wherein the third and sixth transistors are different in transistor size from each other.

18. The semiconductor device as claimed in claim 16, wherein the detection circuit further includes:
    a third node at which the detection signal is generated; and
    seventh and eighth transistors coupled in series between the third node and the voltage terminal, the seventh transistor taking an on-state during the high period of the second clock signal and an off-state during the low period of the second clock signal, the eighth transistor being different in current capability from each of the third and sixth transistors.

19. The semiconductor device as claimed in claim 18, wherein gates of the third, sixth and eighth transistors are electrically coupled to each other.

* * * * *